(12) United States Patent
Diamond et al.

(10) Patent No.: US 11,609,114 B2
(45) Date of Patent: Mar. 21, 2023

(54) METHOD AND SYSTEM FOR MONITORING ROTOR BLADES OF A TURBOMACHINE USING BLADE TIP TIMING (BTT)

(71) Applicant: University of Pretoria, Pretoria (ZA)

(72) Inventors: David Hercules Diamond, Pretoria (ZA); Philippus Stephanus Heyns, Pretoria (ZA); Abraham Johannes Oberholster, Pretoria (ZA)

(73) Assignee: University of Pretoria, Pretoria (ZA)

(*) Notice: Subject to any disclaimer, the term of this patent is extended or adjusted under 35 U.S.C. 154(b) by 1074 days.

(21) Appl. No.: 16/311,936

(22) PCT Filed: Jun. 27, 2017

(86) PCT No.: PCT/IB2017/053827
§ 371 (c)(1),
(2) Date: Dec. 20, 2018

(87) PCT Pub. No.: WO2018/002818
PCT Pub. Date: Jan. 4, 2018

(65) Prior Publication Data
US 2019/0212188 A1    Jul. 11, 2019

(30) Foreign Application Priority Data
Jun. 27, 2016   (ZA) ................................ 2016/04321

(51) Int. Cl.
*G01H 11/00*  (2006.01)
*G01H 1/00*   (2006.01)
(Continued)

(52) U.S. Cl.
CPC ............. *G01H 11/00* (2013.01); *G01H 1/006* (2013.01); *G01H 9/00* (2013.01); *F05D 2260/80* (2013.01); *G01M 15/14* (2013.01)

(58) Field of Classification Search
CPC ............................ G01H 11/00; G01H 1/006
(Continued)

(56) References Cited

U.S. PATENT DOCUMENTS

| | | | |
|---|---|---|---|
| 4,827,435 A | 5/1989 | Marron | |
| 5,365,787 A | 11/1994 | Hernandez | |

(Continued)

FOREIGN PATENT DOCUMENTS

| | | | | |
|---|---|---|---|---|
| CN | 105092249 A | | 11/2015 | |
| WO | WO-2011134473 A1 | * | 11/2011 | ............. F03D 17/00 |
| WO | 2016016632 A1 | | 2/2016 | |

OTHER PUBLICATIONS

Radoslaw Przysowa et al., Inductive Sensors for Blade Tip-Timing in Gas Turbines, Journal of Konbin, Dec. 1, 2015, vol. 36, No. 1.
(Continued)

*Primary Examiner* — Ricky Go
(74) *Attorney, Agent, or Firm* — Vitale, Vickrey, Niro & Gasey LLP

(57) ABSTRACT

A method (400) of determining blade tip deflection characteristics is applied to moving rotor blades ($R_1$, $R_2$) in a turbomachine (10) comprising a housing and rotor including a shaft with the rotor blades attached thereto and at least one proximity probe (202). The method (400) includes measuring ((402) a proximity signal caused by a presence of a proximate tip of a moving rotor blade ($R_1$) and calculating (404) by a control module (212) a shaft Instantaneous Angular Position (IAP) as a function of time, and performing (410) an order tracking process which includes expressing (412) the measured proximity signal in the angular domain and resampling (414) the expressed proximity signal to render it equidistant in the angular domain. The method (400) includes performing (416) a pulse localisation process which includes filtering (418) the proximity signal yielding a complex-valued response, expressing (420) the complex-
(Continued)

valued response in terms of a local amplitude and phase, and calculating (422) local phase shifts between each expressed signal and a reference signal.

17 Claims, 10 Drawing Sheets

(51) Int. Cl.
  *G01H 9/00* (2006.01)
  *G01M 15/14* (2006.01)
(58) Field of Classification Search
  USPC .......................................................... 702/56
  See application file for complete search history.

(56) References Cited

U.S. PATENT DOCUMENTS

| | | | |
|---|---|---|---|
| 9,909,563 B2 * | 3/2018 | Cook | F03D 7/047 |
| 2004/0128035 A1 | 7/2004 | Vandervort | |
| 2009/0314092 A1 | 12/2009 | Twerdochlib | |
| 2010/0153031 A1 * | 6/2010 | Russhard | G01H 1/006 |
| | | | 702/56 |
| 2015/0132130 A1 * | 5/2015 | Brown | F03D 7/022 |
| | | | 416/43 |
| 2018/0171984 A1 * | 6/2018 | David | F03D 7/0288 |

OTHER PUBLICATIONS

International Search Report in corresponding PCT Application No. PCT/IB2017/053827.

* cited by examiner

METHOD AND SYSTEM FOR MONITORING ROTOR BLADES OF A TURBOMACHINE USING BLADE TIP TIMING (BTT)

This patent application is a 35 U.S.C 371 national stage application of International Patent Application No. PCT/IB2017/053827, filed on Jun. 27, 2017, which claims priority to South African Patent Application No. 2016/04321, filed on Jun. 27, 2016. All of these disclosures are hereby expressly incorporated by reference as part of the present disclosure as if fully set forth herein.

FIELD OF INVENTION

This invention relates to monitoring of turbomachinery and more specifically to a method and system for monitoring rotor blades of a turbomachine using Blade Tip Timing (BTT).

BACKGROUND OF INVENTION

A turbomachine can be classified as a machine that extracts or imparts work from/to a fluid (e.g., any liquid or gas) by means of rotating blades. The blades (henceforth called rotor blades) are attached to a shaft that rotates (henceforth called the rotor). The rotor blades are therefore fundamental to the operation of any turbomachine.

As rotor blades are mechanical structures, the complete structure tends to vibrate when excited (i.e. when dynamic loads are applied to the structure, such as when the rotor blade is extracting/imparting energy from/to the fluid). The tip deflection of the rotor blade at each time instant is defined as the distance that the blade tip is displaced from its non-vibrating condition (i.e. resting condition). Tip deflections are therefore those changes in rotor blade tip position apart from the rigid rotation experienced by the rotor blades due to the rotation of the rotor.

Blade Tip Timing (BTT) is a non-invasive technique used for measuring the tip deflections of rotor blades as they pass stationary sensors or probes mounted in the turbomachine casing. The blade tip deflections are calculated from knowledge of the expected arrival time and the true arrival time, or ToA (Time-of-Arrival). Many different methods exist to determine the blade tip deflection from the measured ToAs. Vibration characteristics such as the amplitude, frequency and phase can be estimated through the use of sophisticated algorithms and methods (one of which is disclosed in PCT patent application no. PCT/IB2017/052364).

All of these algorithms use tip deflection measurements to determine the vibration characteristics of rotor blades. It is therefore extremely important for the tip deflection measurements to be as accurate as possible. The accuracy with which the tip deflection can be calculated depends upon factors such as the sampling rate of the data acquisition system as well as the shape of the proximity probe pulse waveform as the rotor blade passes underneath the probe. Conventional methods of determining the rotor blade tip displacement become inaccurate if the sampling rate of the data acquisition system is sub-optimal.

BTT has many advantages over strain gauge measurements, which is considered to be one of the conventional methods of conducting rotor blade vibration measurements. Strain gauges are applied to the root of the rotor blade. They are usually powered through a battery or a slip ring connected cable. The measured signals are then communicated through a telemetry system or a slip ring. Limitations of the strain gauge method are cost, operational lifetime and only being able to instrument a limited number of blades. Strain gauges also change the dynamic characteristics of the blade onto which it is mounted. The BTT method, in contrast, measures all the blades in a rotor stage and has a longer operational lifetime [1, 2, 3]. Tip deflections can be correlated with Finite Element Models (FEM) to estimate the dynamic stress in rotor blades [4]. This allows one to assess the severity of resonances and could be used to estimate the remaining life of the rotor 30 blades. The most fundamental task of any BTT system is to determine the rotor blade tip deflections.

The utility of BTT depends on the accuracy with which one can measure the rotor blade tip deflections. The severity of vibration amplitudes might be over- or under-estimated or missed completely if too much noise is present in the measured tip deflections. This assertion is illustrated through use of the standard PRIOR ART equation used to calculate the tip deflection [5]:

$$x = \Omega R \Delta t \quad (1)$$

In Eq. (1), x indicates the rotor tip displacement, $\Omega$ is the rotor speed, R is the outside radius of the rotor blade and $\Delta t$ is the difference between the measured arrival time and the expected no-vibration arrival time. It can be seen from Eq. (1) that the tip deflection is directly proportional to the time difference.

Even a very small error in the measured actual arrival time can result in a large tip deflection error. The error in tip deflection per error in arrival time difference can be obtained through differentiating Eq. (1) and multiplying it with the error in the measured arrival time:

$$\delta x = \Omega R \delta t \quad (2)$$

where $\delta t$ is the error in measured arrival time. Using a simple example of a rotor operating at a constant speed of 3000 RPM with an outside diameter of 1 meter, if the measured arrival time is incorrect by just 1 μs, the error in tip deflection is calculated as:

$$\delta x = \frac{3000 \times 2\pi}{60} \times 0.5 \times 10^6 1 \times 10^{-6} \quad (3)$$

$$\delta x \approx 157 \, \mu m$$

An error of 157 μm is a non-negligible error. It has been reported in literature that a non-resonating blade experiences vibration amplitudes of 100 μm under nominal conditions and no more than 400 μm under resonant conditions [6]. This represents a measurement error of 157% and 40% respectively. These errors are large and could render the measurements useless. It stands to reason, therefore, that the blade arrival time should be determined as accurately as possible.

The present invention accordingly describes a new method to determine the tip deflection of rotor blades from a proximity probe mounted into a turbomachine casing. All existing techniques, of which the Applicant is aware, for doing the abovementioned task use a type of triggering criteria on the proximity probe pulse to determine the tip deflection. The four most popular techniques (graphically illustrated in FIG. 1) are:

Maximum amplitude rate: Trigger the rotor blade Time-of-Arrival (ToA) at the moment the signal experiences the largest change rate.

Fixed Voltage: Trigger the ToA when the signal crosses a predetermined threshold value.

Maximum amplitude: Trigger the ToA at the time that the signal reaches its highest, or maximum, value.

Constant fraction crossing: The ToA is triggered once the pulse shape crosses a predetermined threshold value on the pulse downward slope. The threshold value is a fraction of the maximum amplitude.

Understandably, as the sampling rate of the probes decreases, the error of these techniques increases. The Applicant accordingly desires a method and system for determining tip deflection of rotor blades which generally has a better error rate, particularly at lower sampling rates, then one or more of the existing techniques.

There is no widespread consensus regarding which of the above methods should be used. Zimmer [7] states that the attributes of the maximum amplitude approach can result in the most accurate triggering criterion. She notes, however, that certain pulse shapes can be troublesome to work with. The most notable of these are when the waveform has two distinct peaks per blade passage. This can result in multiple ToAs being triggered per single blade passage.

It is also imperative for the sampling rate of the data acquisition system to be high enough. It has already been demonstrated in Eq. (3) that a timing resolution of 1 μs (corresponding to a sampling rate of 1 MHz) can result in a large tip deflection measurement error. It is for this reason that commercial BTT systems often report immensely high sampling rates. Some of the highest sampling rates reported in literature are 500 MHz [8] and 100 MHz [9]. These sampling rates are generally regarded as very high and require specialized data acquisition hardware. Although such data acquisition systems are available, they are not prevalent and can be prohibitively expensive. This is especially the case if several proximity probe signals must be sampled simultaneously.

SUMMARY OF INVENTION

Accordingly, the invention provides a method of determining or estimating blade tip deflection characteristics of moving rotor blades in a turbomachine comprising a housing and rotor including a shaft with the rotor blades attached thereto and at least one proximity probe mounted to the housing, the method including:
  measuring, by the proximity sensor, a proximity signal caused by a presence of a proximate tip of a moving rotor blade;
  calculating, by a control module based on measurements by at least one shaft encoder or derivation from proximity probe measurements, a shaft Instantaneous Angular Position (IAP) as a function of time;
  storing, in a memory module, at least temporarily, a plurality of measured proximity signals and associated shaft IAPs;
  performing, by the control module, an order tracking process which includes:
    expressing, by the control module, the measured proximity signal in the angular domain; and
    resampling, by the control module, the expressed proximity signal to render it equidistant in the angular domain; and
  performing, by the control module, a pulse localisation process, which includes:
    filtering, by the control module using a complex filter, the proximity signal yielding a complex-valued response;
    expressing, by the control module, the complex-valued response in terms of a local amplitude and phase; and
    calculating, by the control module, local phase shifts between each expressed signal and a reference signal, thereby to calculate the blade tip deflection characteristics.

Order tracking may be performed on the proximity signals and the shaft IAP in order to convert the measured signals from having constant time increments to constant angular increments. Methods exist to perform order tracking, some more complicated than others [14, 15, 16].

The method may include raising an alert in response to the estimated deflection characteristics exceeding a first threshold (e.g., a maintenance threshold). The method may include raising an alert by sending an alert message to a designated recipient (e.g., a plant administrator).

The method may include automatically stopping the turbomachine in response to the calculated blade tip deflection characteristics exceeding a second threshold (e.g., a failure threshold). The control module may be connected to a control system of the turbomachine.

The method may include sending, by the control module, an interrupt message to the control system of the turbomachine.

The method may include measuring a tip deflection every time that the associated rotor blade passes the sensor. There may be plural sensors arranged circumferentially around the housing. Accordingly, the method may include measuring the proximity signal caused by the blade tip at various angular orientations.

The method may include measuring the rotor IAP through processing, through the control module, signals obtained from the shaft encoder.

The method may include measuring the rotor IAP through processing, through the control module, the proximity signals obtained from the proximity probe.

The invention extends to a system configured to determine or estimate blade tip deflection characteristics of moving rotor blades in a turbomachine comprising a housing and rotor including a shaft with the rotor blades attached thereto and at least one proximity probe mounted to the housing, the system including:
  at least one proximity sensor mounted into the housing and configured to generate a proximity signal from a presence of a proximate tip of a moving rotor blade;
  a sensor to measure or derive a shaft Instantaneous Angular Position (IAP);
  a memory module on which is stored, at least temporarily, a plurality of measured proximity signals and associated shaft IAPs; and
  a control module configured to:
    express the shaft IAP as a function of time, whether this is derived from a shaft encoder or from the proximity probe measurements;
    perform an order tracking process which includes:
      expressing the measured proximity signal in the angular domain; and
      resampling the expressed proximity signal to render it equidistant in the angular domain; and
    perform a pulse localization process which includes:
      filtering, using a complex filter, the proximity signal yielding a complex-valued response;
      expressing, the complex-valued response in terms of a local amplitude and phase signal; and
      calculating, local phase shifts between each expressed signal and a reference signal, thereby to calculate the blade tip deflection characteristics.

There may be a plurality of proximity sensors. The sensors may be spaced circumferentially around the housing. The sensors may be spaced circumferentially along only an arcuate portion of the housing. The sensors may be spaced along a 90° arc. For example, there may be four sensors, each spaced 20-30° apart. The sensors may be regularly or irregularly spaced apart.

The sensor to measure or derive the shaft IAP may be a shaft encoder. The sensor to measure or derive the shaft IAP may be the proximity probe(s).

The invention extends to a non-transitory computer-readable medium having stored thereon a computer program which, when executed by a computer, causes the computer to perform the method as defined above.

BRIEF DESCRIPTION OF DRAWINGS

The invention will now be further described, by way of example, with reference to the accompanying diagrammatic drawings.

In the drawings.

DETAILED DESCRIPTION OF EXAMPLE EMBODIMENT

The following description of the invention is provided as an enabling teaching of the invention. Those skilled in the relevant art will recognise that many changes can be made to the embodiment described, while still attaining the beneficial results of the present invention. It will also be apparent that some of the desired benefits of the present invention can be attained by selecting some of the features of the present invention without utilising other features. Accordingly, those skilled in the art will recognise that modifications and adaptations to the present invention are possible and can even be desirable in certain circumstances, and are a part of the present invention. Thus, the following description is provided as illustrative of the principles of the present invention and not a limitation thereof.

Figure 2:
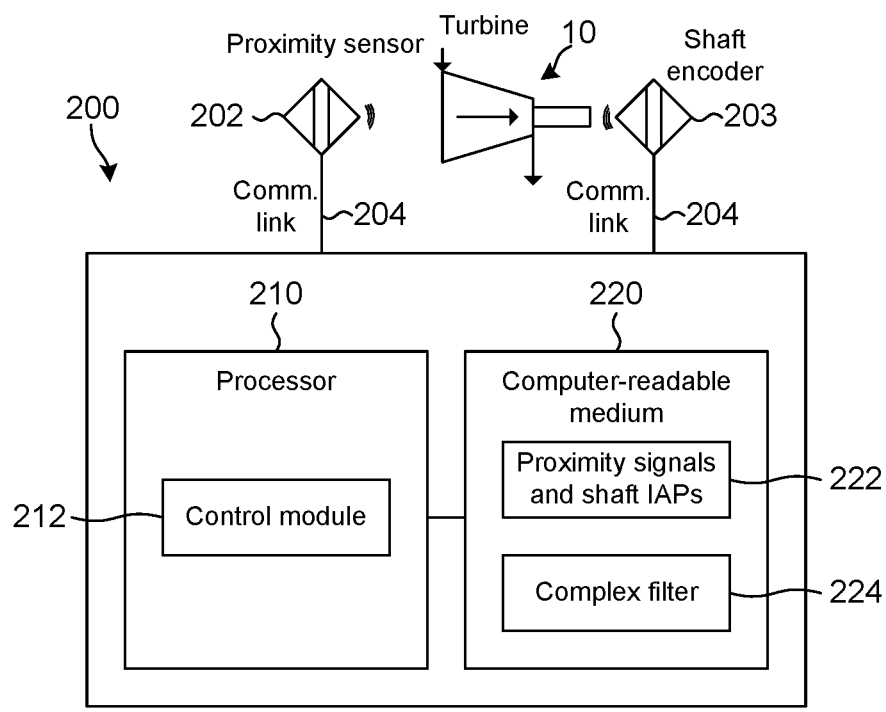
FIG. 2 shows a schematic view of a system configured to determine or estimate blade tip deflection characteristics of moving rotor blades in a turbomachine, in accordance with the invention.

FIG. 2 illustrates a system 200 configured to determine or estimate blade tip deflection characteristics of moving rotor blades in a turbomachine. In this example, the turbomachine is a turbine 10. The turbine 10 may be a conventional turbine and its operation need not necessarily be modified to be compatible with the system 200 (other than incorporation of sensors 202). The turbine 10 comprises a housing and rotor including a shaft with the rotor blades attached thereto (see FIG. 3 for more detail).

The system 200 includes a plurality of sensors 202 mounted to a housing of the turbine 10. In another embodiment, the system 200 may include only a single sensor 202. The system 200 includes a shaft encoder 203 to measure information used to determine the shaft IAP. The system 200 includes a processor 210 connected to the sensors 202 by means of a communication link 204 (which may be wired or wireless). The processor 210 is coupled to a computer-readable medium 220. On the computer-readable medium 220 (which serves as a memory module) is stored proximity signals and associated shaft IAPs 222 and a complex filter 224 these are further described below.

The processor 210 embodies a control module 212 which is configured to process BTT measurements in accordance with the complex filter 224 thereby to measure ToA more accurately and to estimate rotor blade deflection. The control module 212 is a conceptual module corresponding to a functional task performed by the processor 210. It is to be understood that the processor 212 may be one or more microprocessors, controllers, Digital Signal Processors (DSPs), or any other suitable computing device, resource, hardware, software, or embedded logic.

Figure 3:
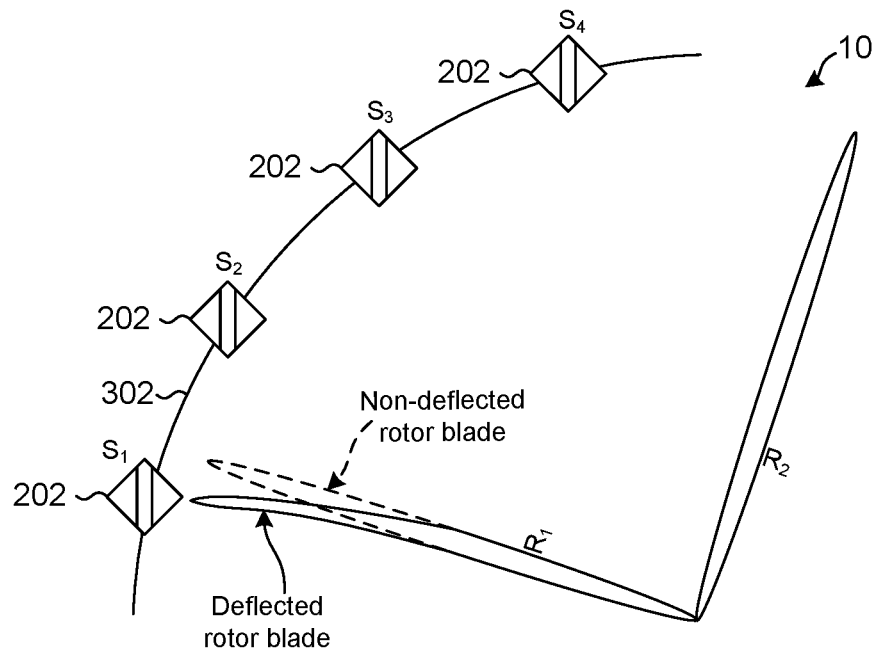
FIG. 3 shows a schematic view of an enlarged portion of a turbine of FIG. 2.

The system 200 has a plurality of proximity sensors 212 (only one of which is illustrated in FIG. 2). FIG. 3 illustrates this in more detail, with the plural sensors 202 being designated $S_1$-$S_4$ and arranged circumferentially on the housing 302. Each proximity sensor 202 is configured to generate a proximity signal due to a proximate tip of a moving rotor blade ($R_1$, $R_2$, . . . ). These generated proximity signals are stored on the memory module 220 for processing. The system 200 also has a shaft encoder 203 that measures raw signals of the rotor motion, converted to a series of IAP measurements, after which the data is stored on the memory module 220.

In general terms, it is known that a proximity probe reacts to the presence of rotor blade tips as they pass underneath the probe. If the presence of the rotor tip is short lived, due to a faster rotational speed, it stands to reason that the proximity probe signal pulse will span over a short interval. This is true if one is working in the time domain. If, however, the signal can be order tracked, the angular position and width of these pulses will nominally be constant. Each revolution of the shaft will therefore, given the absence of rotor blade vibration and noise, appear identical in the order domain. The order tracked proximity probe signal can therefore be interpreted 85 as a one dimensional image where the domain units go from 0 to 2 n radians and the image intensity values are the proximity probe signal values. The use of "image" in this case is used simply as a conceptual tool to illustrate the repeating nature of the signal. "Image" and "signal" can be used interchangeably.

Figure 5:
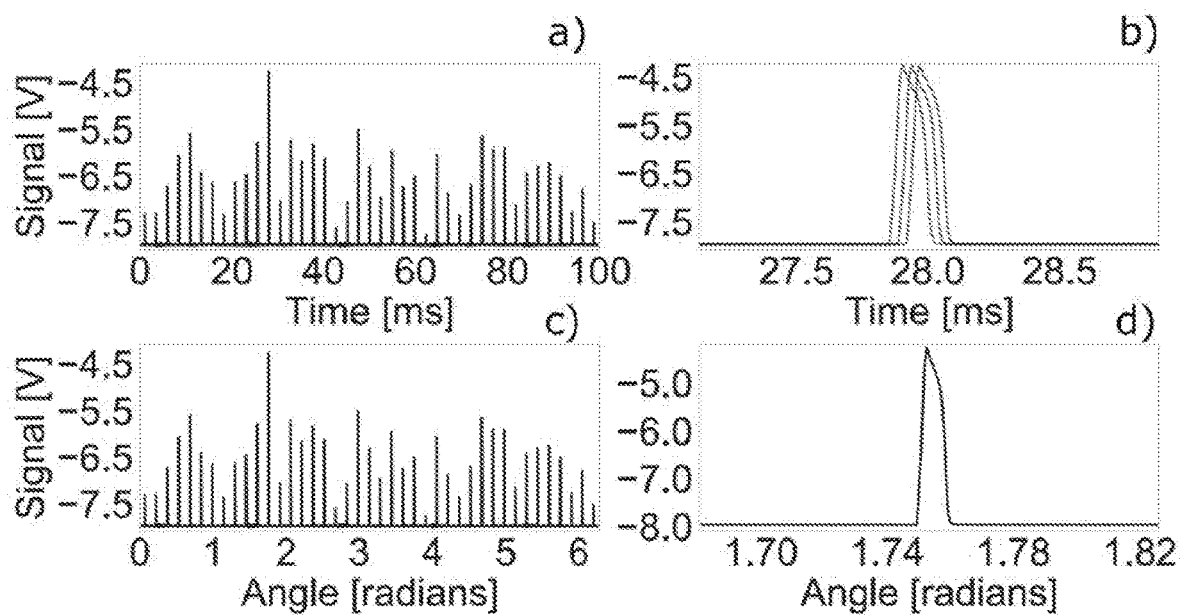
FIG. 5 shows a graphical view of proximity signals (derived from the method of FIG. 4) from three consecutive shaft revolutions during an axial compressor run-up. a) All three revolutions are overlaid on one another, aligned with the start of each revolution, b) the same signal as in a), only zoomed in to a single pulse, c) All three proximity probe signals overlaid on one another in the order domain, i.e. the proximity probe signals as a function of shaft circumferential position, d) the same signal as in c) only zoomed in to a single pulse.

This concept is illustrated in FIG. 5 which shows the proximity probe signals acquired at a BTT test conducted on a large axial compressor during a run-up. FIG. 5 a) shows the proximity probe signal versus the time elapsed since the start of each revolution for three consecutive revolutions. FIG. 3 b) shows the exact same signal, only zoomed into a specific pulse. FIGS. 3 c) and d) shows the same signals as in a) and b), only plotted versus the shaft angular position, i.e. the order tracked signal. It can be seen from FIG. 3 b) that the pulses from different revolutions do not occur at the exact same time after the start of each revolution. This stands to reason as the shaft speed is increasing continuously. If one were to look close enough to the pulse widths during the three different revolutions, one would see that the pulses generated during slower shaft speeds are wider than those generated during faster shaft speeds. When one looks at FIG. 3 d), it is apparent that the pulses occur at the exact same angular position and have exactly the same shape and width.

It has now been demonstrated that the order tracked proximity probe signal for each revolution should be identical in the absence of blade vibration and noise. These three order tracked signals can therefore be interpreted as three images taken over the entire angular domain of the shaft. The images, instead of having multiple pixel sensors, have one sensor (the proximity probe) and measures different parts of the domain through the rotation of the shaft.

Suppose a rotor blade tip is deflected due to vibration. This will appear in a one dimensional image as if the pulse is shifted in the angular domain, but with an identical shape. The purpose of the triggering criterion is therefore to determine the shift of this pulse in each image. The shift will therefore be in units of radians, and Eq. (1) is replaced by the below equation to calculate the tip deflection:

$$x = \Delta\theta R \quad (4)$$

Figure 6:
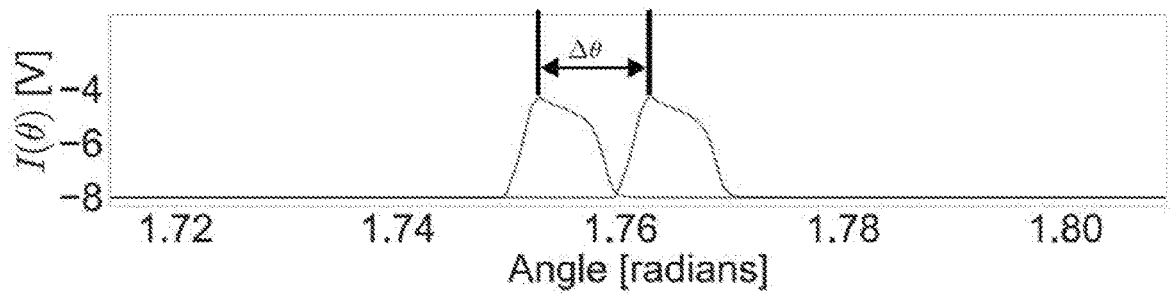
FIG. 6 shows a graphical view of a shifted pulse due to blade vibration in the one dimensional image.

FIG. 6 illustrates this concept with a shifted pulse in the 1D image. In FIG. 6, I($\theta$) denotes the image intensity as a function of circumferential position. Image processing techniques can now be used to determine the shift in this pulse. Many techniques exist to determine moving features in an image, some of the most popular techniques being used in vibration monitoring are Digital Image Correlation (DIC) [10] and Marker Tracking (MT) [11]. Both of these methods first find features in an image and then track the features through subsequent images. They can therefore be classified as Lagrangian techniques.

Figure 4:
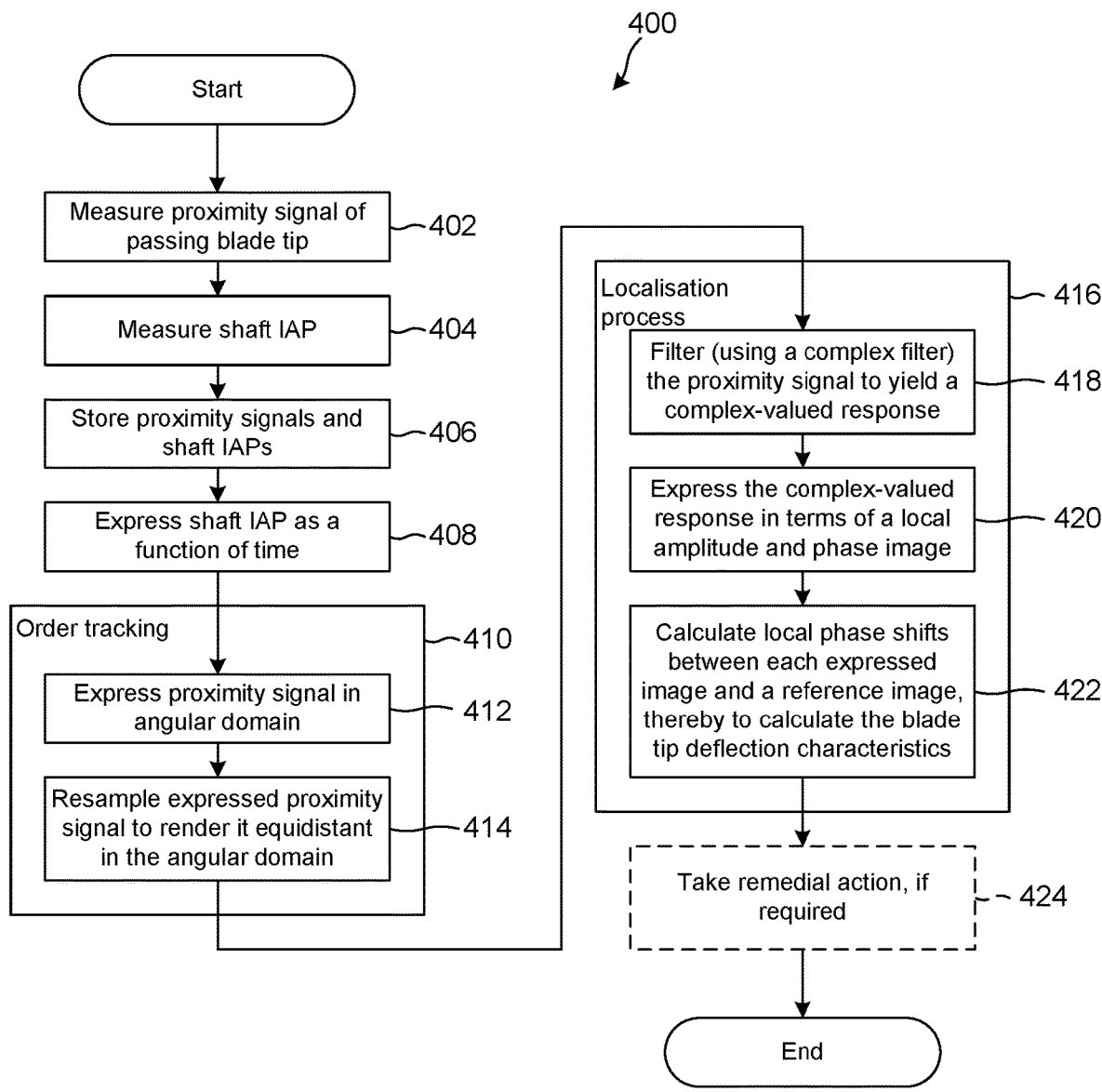
FIG. 4 shows a flow diagram of a method of to determining or estimating blade tip deflection characteristics of moving rotor blades in a turbomachine, in accordance with the invention.

FIG. 4 illustrates a method 400 of determining or estimating blade tip deflection characteristics of moving rotor blades in a turbomachine. Steps 402-406 may be common to various BTT implementations. The method 400 involves measuring (at step 402), using the proximity sensors or probes 202, a proximity signal caused by proximity of a blade tip of a rotating rotor blade $R_1$. The shaft encoder 203 measures (at step 404) the IAP of the shaft (or, at least, generates a signal from which the IAP may be determined). A plurality of measurements of the proximity signals and the IAPs are stored (at step 406) in the memory module 220.

The method 400 then comprises order tracking (at block 410). In this example, the method 400 employs a simple and computationally inexpensive method to perform order tracking. The method 400 assumes the use of an incremental shaft encoder 203, either a One Pulse per Revolution (OPR) or a Multiple Pulses per Revolution (MPR) shaft encoder. If a MPR encoder is used, it may be necessary to perform geometry compensation on the sections [17].

The process of determining the shaft IAP from an incremental shaft encoder has been described and presented in previous works [18]. Only the results and necessary notation will therefore be summarised. If measurements were taken for a duration of M revolutions and the shaft encoder 203 in question has N incremental sections. The shaft angular position as a function of time in encoder section n during revolution m can be expressed as:

$$\theta_{m,n}(\tau_{m,n}) = \tfrac{1}{2} a_{m,n} \tau_{m,n}^2 + \Omega_{m,n} \tau_{m,n} + \Theta(n) \quad (5)$$

$\theta_{m,n}$ is the shaft IAP in revolution m and encoder section n, henceforth referred to as the present section. The elapsed time since the start of the present section is denoted by $\tau_{m,n}$, $a_{m,n}$ is the constant angular acceleration in the present section and $\Omega_{m,n}$ is the constant angular speed in the present section. The cumulative angular distance travelled during revolution m up to the start of the present section is referred to as $\Theta(n)$.

With Eq. (5) it is possible to order track any proximity probe signal, e.g. express the signal as a function of angular distance travelled within a single rotation. Mathematically, this is done by:

$$I_{m,n}(\theta_{m,n}(\tau_{m,n})) = p(t_{m,n} + \tau_{m,n}) \quad (6)$$

where $I_{m,n}$ refers to the order tracked proximity probe signal in the present section and is called the image 145 intensity, and p is the raw sampled signal. The start of the present section is denoted by $t_{m,n}$. The image intensity values for each section can simply be latched onto one another to create an image of the entire revolution. An illustration of a proximity probe signal for a single revolution and its order tracked image is shown in FIGS. 5 a) and c) respectively (step 412).

At this stage, the image is not equally spaced in the angular domain and needs to be resampled (step 414) to accomplish this. The resampling process uses linear interpolation to obtain a new set of samples spaced at constant angle increments. Linear interpolation was chosen above higher order interpolation as found in [19] and [16] because of its computational simplicity and the fact that the angular samples are spaced closely to one another. It is preferable that the resampling angular resolution be as small or smaller than the smallest angular increment after order tracking is performed, otherwise aliasing can be introduced. After the resampling, the pulse localisation process (block 416) is performed.

Figure 7:
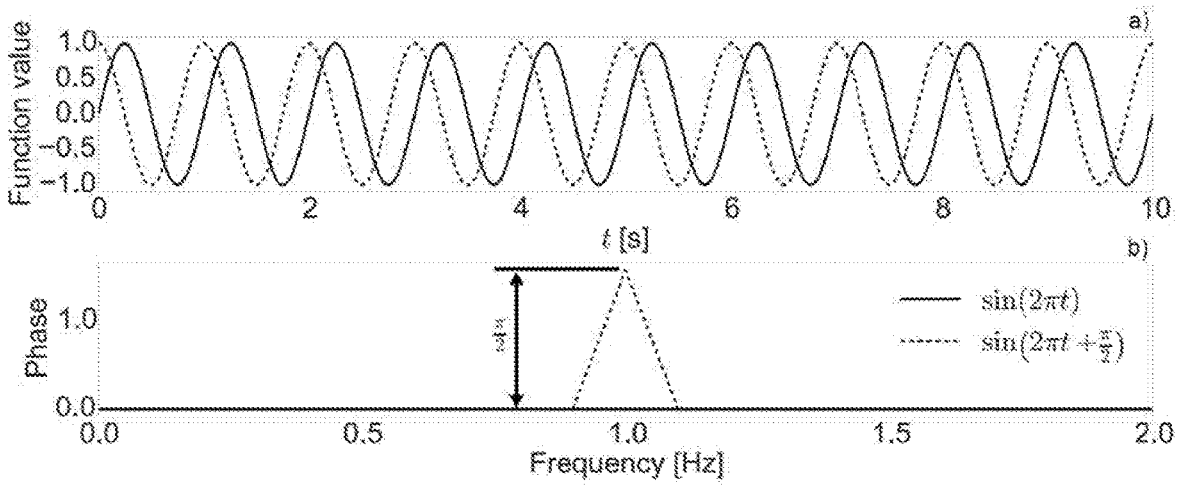
FIG. 7 shows a graphical view of how phase information (from the method of FIG. 4) can be used to determine location. a) Two sinusoids in the time domain at a frequency of 1 Hz, the sinusoids differ in phase by $\pi/2$. b) The phase of the Fourier transforms of these sinusoids. (Note that all phase values with a non-significant amplitude was artificially set to zero for better visualisation.)

An aim of the localisation process (block 416) is to determine a pulse position through manipulation of the local phase information in an image. As an illustration, consider a simple example of two sinusoids with a phase difference of $$\frac{\pi}{2},$$

shown in FIG. 7. FIG. 7 a) shows the two sinusoids in the time domain, one shifted by $$\frac{\pi}{2}$$

radians. Although the amplitudes of these sinusoids are identical, the phase difference between them is quantifiable and allows one to determine the shift between the two sinusoids. This is a graphical illustration of the Fourier Shift Theorem.

The example shown in FIG. 7 illustrates how global phase can be used to determine the shift in a sinusoidal signal. Each proximity probe pulse is, however, localised to a finite spatial region and therefore possesses local phase information instead and cannot be localised using the global phase information. The local phase information of each pulse can be obtained through convolution with a quadrature filter possessing sufficient spatial support to determine the local phase of the entire pulse. The specific filter used here is a one dimensional version of the filter specified by Freeman and Adelson [20] and also used by Chen et al [12], another popular choice is the use of a Gabor filter [21]. The real part of the filter is the second derivative of a Gaussian function:

$$G_2(\theta) = e^{\frac{-\theta^2}{\rho^2}} \left( \frac{4}{\rho^4} \theta^2 - \frac{2}{\rho^2} \right) \tag{7}$$

The scaling parameter, $\rho$, governs the spatial support of the filter and can be tuned based on the width of the waveform pulses measured by the proximity probe. The filter should encompass the entire pulse shape if it is to determine the correct local phase of the pulse. A filter with limited spatial support leads to inaccurate estimations of local phase [22]. The function $G_2$ represents a real valued filter. The complex filter 224 is obtained through taking the analytic signal of $G_2$. The final, complex, filter 224 can be expressed as:

$$K_2(\theta) = G_2(\theta) + iH_2(\theta) \tag{8}$$

where $K_2$ is the complex filter 224 and $H_2$ is the imaginary coefficients of the filter 224. Accordingly, the proximity signal is filtered (at step 418) using the complex filter 224 (Eq. (8), for example) to yield a complex-valued response.

Figure 8:
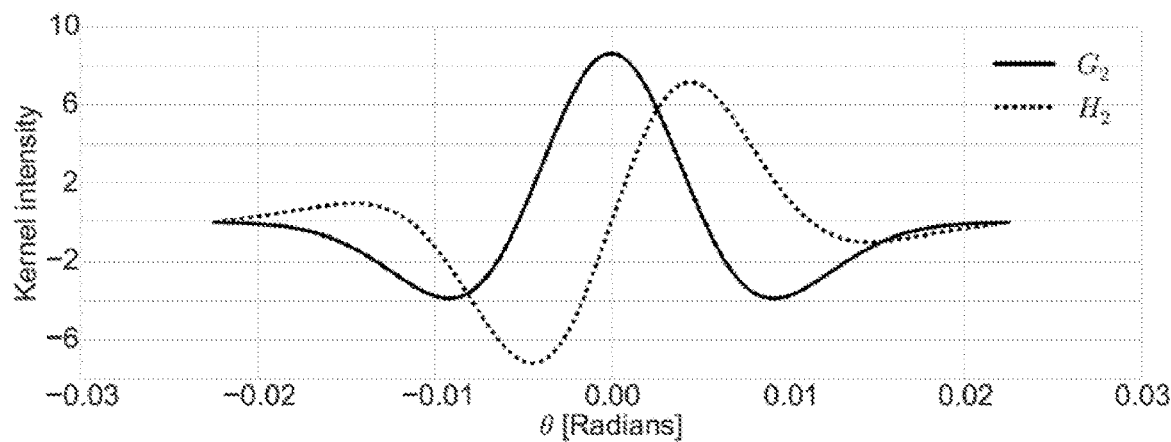
FIG. 8 shows a graphical view of real and complex parts of a complex filter (from the method of FIG. 4) used to localise the phase information in an image.
Figure 9:
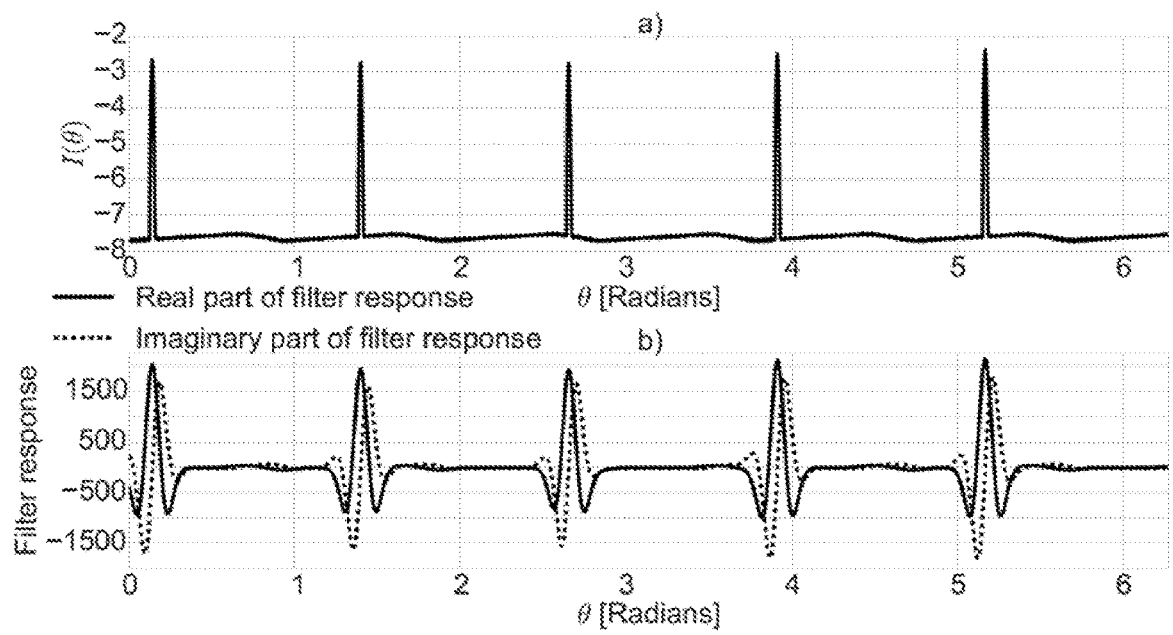
FIG. 9 shows a graphical view of results (from the method of FIG. 4) obtained from convolving the one dimensional image with $K_2$, a) the original image and b) the real and imaginary responses after convolution.

An example of the complex filter 224 is shown in FIG. 8. This quadrature filter is convolved with the one dimensional images. The resulting image (from step 418) has a real part and an imaginary part. FIG. 8 a) shows a one dimensional image from previously conducted BTT tests and FIG. 8 b) shows the real and imaginary responses after convolution with the complex filter (224). The filter used for FIG. 8 is very wide because of a large scaling factor. This was done merely for the purpose of illustrative clarity. The real and imaginary parts of the image can now be expressed (step 420) in polar form, i.e., an amplitude and a phase. The amplitude and phase of FIG. 8 b) are shown in FIG. 9. It can be seen that the phase varies over the image and specifically changes over the pulse region. It has been shown in literature that the local phase shifts between subsequent images can be used to calculate the local movements in an image. The equation corresponding to this calculation is [21, 23]:

$$u = \left( \frac{\partial \varphi(\theta, m)}{\partial \theta} \right)^{-1} \left( \frac{\partial \varphi(\theta, m)}{\partial m} \right) \tag{9}$$

Eq. (9) can be used to calculate the shift in pulse location from one image to the next image at any circumferential position. The sought after quantity is the difference between all the blade pulses in revolution m and the pulses in a reference revolution (step 422), $m_{ref}$. The reference revolution is usually taken as the first revolution of the acquisition. Taking this into account and noting that the calculation of the local phase is done computationally, the Eq. (9) can be rewritten in a discrete form to calculate the pulse shift for blade b in revolution m. The blade radius is additionally multiplied with the discrete equation, yielding the blade tip deflection. This is shown as:

$$x_b(m) = Rd\theta \left( \frac{\varphi(\theta_b, m) - \varphi(\theta_b, m_{ref})}{\varphi(\theta_b + d\theta m) - \varphi(\theta_b, m)} \right) \tag{10}$$

where b denotes a specific blade on the rotor, $\theta_b$ is the angular location of that blade in the one dimensional image and $d\theta$ is the sampling increment size of the image.

Figure 10:
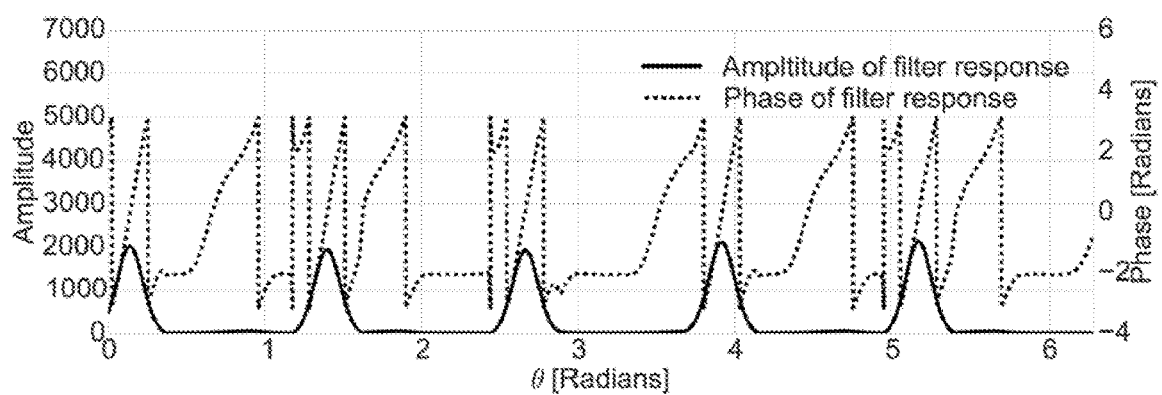
FIG. 10 shows a graphical view of a filter response expressed in polar form, i.e. in an amplitude and a phase (from the method of FIG. 4)
Figure 11:
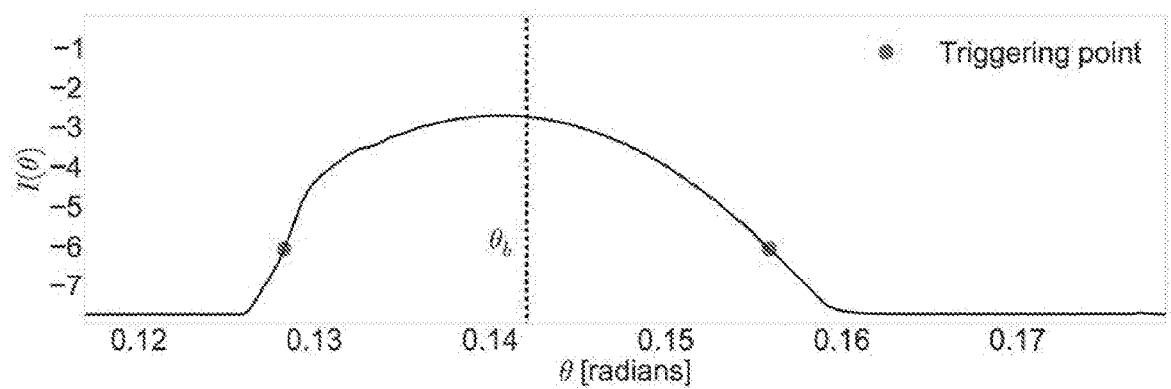
FIG. 11 shows a graphical view of a determination of the angular location, $\theta b$, (from the method of FIG. 4) where the local phase of a each blade b is determined.

Eq. 10 allows one to calculate the tip deflection for each rotor blade $R_1$ in each rotation. Note that the calculated tip deflections assume that the pulses during the reference revolution were generated by non-vibrating blades (step 422). There is no reason to suppose that these pulses are in actual fact located at each blade's non-vibrating position. It is therefore customary to subtract the average tip deflection from each calculated tip deflection after all M revolutions have been processed. It should also be noted that although the entire one dimensional image is convolved with the $K_2$ in FIG. 10, it is strictly speaking not necessary for the entire image to be convolved with the filter 224. It is only necessary to calculate the filter response at each blade's angular location, $\theta b$. The process followed in this article to determine $\theta b$ for each blade is as follows. A suitable threshold to trigger the reference revolution pulses can be chosen based on the fixed voltage criteria, both on the rising and falling edges of every pulse. The $\theta b$ values are taken to be in the middle of these two angular positions (see FIG. 11).

Since the pulse localisation is performed computationally, the filter kernel consists of different values evaluated at discrete angular points. The angular increments of the kernel's evaluated values must necessarily be equal to the angular increments of the resampled proximity probe image. It is possible to reduce the sampling rate of the image, and consequently the filter kernel, and in doing so reducing the amount of computations required for the convolution. This reduction in sampling rate is usually called downsampling [12] for two dimensional image processing and decimation for one dimensional signal processing. Downsampling is not performed on these images as the reduction in convolution computations would almost certainly be less than the increase in computation required for downsampling. If the entire signal had been convolved with the quadrature filter, instead of just a handful of computations at the θb locations, downsampling might have proven to be computationally beneficial. The filter kernel is therefore evaluated in increments of dθ, starting from −3ρ to 3ρ. It can be seen that the filter's spatial support stops at these bounds.

Experimental Setup and Method

Figure 12:
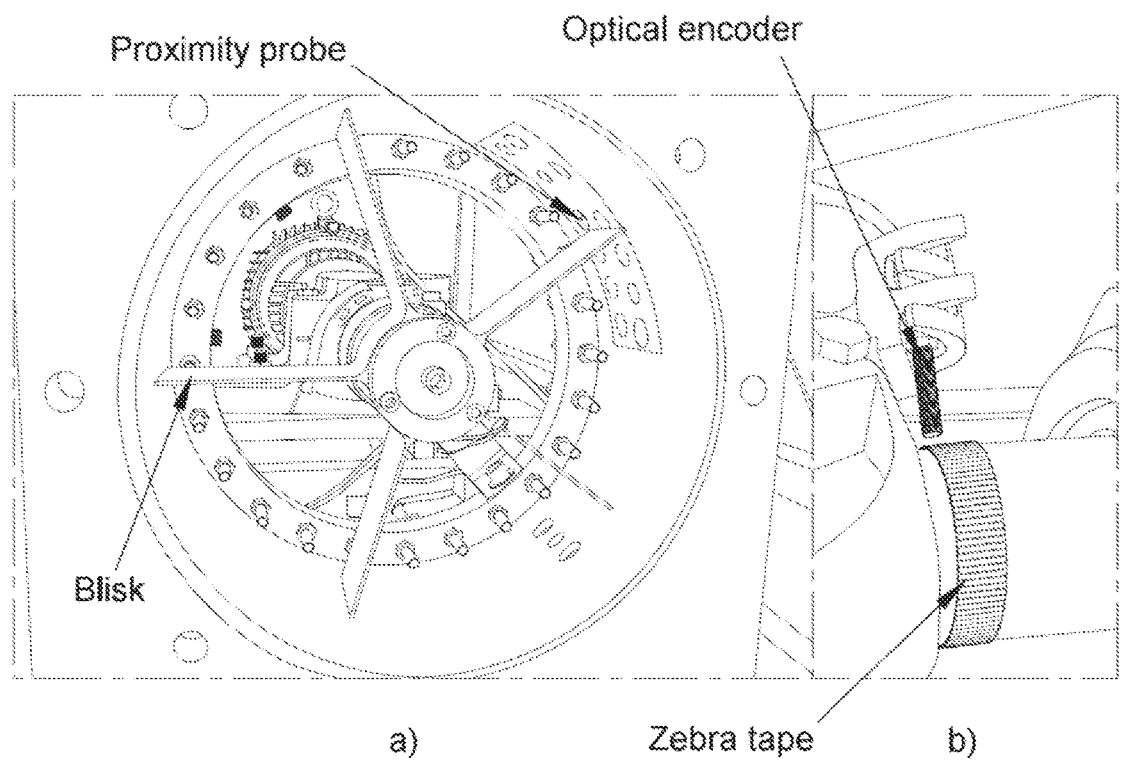
FIG. 12 shows an annotated photograph of an experimental setup to implement the method of FIG. 4. a) an axial view of the turbomachine with the blisk and eddy current probes indicated, b) the optical encoder and the shaft encoder on the shaft.

The turbomachine 10 used for the experiment consists of a shaft supported by two bearings, driven by a three phase motor. The shaft is instrumented with zebra tape and an optical encoder 203 as a shaft encoder. The optical probe output signal consists of TTL pulses. The shaft encoder has 78 sections that are not spaced in equidistant intervals. The algorithm as described in [17] was used to perform shaft encoder geometry compensation. The rotor, a blisk with five rectangular blades, has an outside diameter of 324 mm and is end-mounted onto the shaft with a taper-lock fastening mechanism. The proximity probe 202 used in this experiment is a high sensitivity eddy current probe. The sensitivity of the probe is 8 mV/μm. The probe 202 has a measuring range of 2 mm and was adjusted manually until a proper response was obtained when the blades passed the probe. The proximity probe output normally ranges from −20 V to −0.5 V. A voltage divider was constructed to reduce the voltage to between −8 V and −0.2 V as the data acquisition system has a dynamic range of −10 V to 10 V. The data acquisition system is a NI USB-6366 system, capable of sampling and logging analogue signals at a maximum rate of 2 MHz. LabView was used to control the data 205 acquisition system. FIG. 12 a) shows a front axial view of the rotor and figure b) shows the shaft encoder.

The purpose of the experiment is to demonstrate that the method 400 is capable of yielding accurate tip deflection measurements if the sampling rate of the data acquisition system is sub-optimal, i.e. not high enough by conventional triggering criteria standards. It is customary when evaluating the accuracies of measured quantities to have an independent sensor providing validation data against which the method 400 can be compared. Rotor blade vibration is, however, notoriously difficult to measure. The conventional method of using strain gauge measurements along with some kind of calibration test simply does not yield accurate enough results to reliably predict the size of the tip deflections [24, 5, 25], only specific frequencies involved in the blade response are usually identified.

Another option is to use a two dimensional digital camera to capture the blade tip as it moves past the location of the probe 202. This method was used by Gallego-Garrido et al [26]. Perspex panels, with marked grid lines used to measure distance, were installed into the rotor's casing above the blades. A digital camera was placed above the Perspex panels, looking down on the rotor blades. A strobe light was synchronised with the tachometer, and photographs of a specific 220 blade were taken at different positions of its rotation.

A visual comparison of the camera results against the BTT predicted results showed good general agreement between the two methods. The method was however not used for quantitative comparison of every tip deflection measurement. Even if it is possible to compare individual tip deflection measurements with camera-measured results, the accuracy of the camera itself would also have to be validated. This is especially the case since the tip deflection measurements should be extremely accurate, capable of measuring vibration to within a 3 μm accuracy, as one industry vendor of BTT claims possible [27]. This problem of validating the validation technique would be present for any proposed sensor. This results in an infinite regression of validation activities. Absolute validation methods would therefore not be possible for this type of experiment. A simple truism is rather used to construct a validation method.

It stands to reason that tip deflections calculated with a triggering criterion will be more accurate at higher sampling rates than at lower sampling rates. A certain signal is measured at a high sampling rate and the tip deflections calculated with a specific triggering criterion. If one were to computationally reduce the sampling rate, one would expect the tip deflection calculations to deviate from those calculated at a higher sampling rate. It stands to reason that a more accurate triggering criterion will calculate similar tip deflections at the low sampling rates. The amount of deviation from the original tip deflections can therefore be used as an indication of each triggering criterion's accuracy. The experimental method was thus established:

Run the shaft at a constant speed. The speed used in the experiment was nominally 1200 RPM with 240 small torsional vibration fluctuations about that value.

The shaft encoder signal as well as a proximity probe signal was measured at a rate of 2 MHz by the data acquisition system. The measurement was taken for 10 seconds.

The tip deflections over all revolutions were calculated using the method 400 as well as the maximum amplitude rate, maximum amplitude, fixed voltage and constant fraction crossing methods. The fixed voltage threshold was set to −4 V and the constant fraction was set to 50%. Interpolation was used for both these methods to determine the exact ToA where the appropriate voltage level was crossed.

The sampling rate of the signal was then reduced computationally by simply omitting sampled values from the original signal. Five different sampling rate reductions were done which resulted in five effective tests cases with different sampling rates. The test cases are shown in Table 1.

The error between the tip deflection from the original signal and the reduced sampling frequency signal was calculated for each rotation. The average error was then calculated and reported. This provided an intuitive and accurate way to compare the different triggering criteria.

TABLE 1

| Analysis number | Sampling rate reduction | Equivalent sampling rate |
| --- | --- | --- |
| 1 | 10 | 200.0 kHz |
| 2 | 25 | 80.0 kHz |
| 3 | 40 | 50.0 kHz |
| 4 | 60 | 33.3 kHz |
| 5 | 80 | 25.0 kHz |

Reducing the sampling rate of the shaft encoder 203 will also reduce the accuracy of the determined tip deflections. The sampling rate of the shaft encoder 203 was therefore not reduced. It is also not necessary to investigate each triggering criterion's sensitivity to shaft encoder sampling rate. The effect of a reduced sampling rate will be exactly the same on all triggering criteria as the shaft encoder signal is used identically to order track the proximity probe signals.

Figure 13:
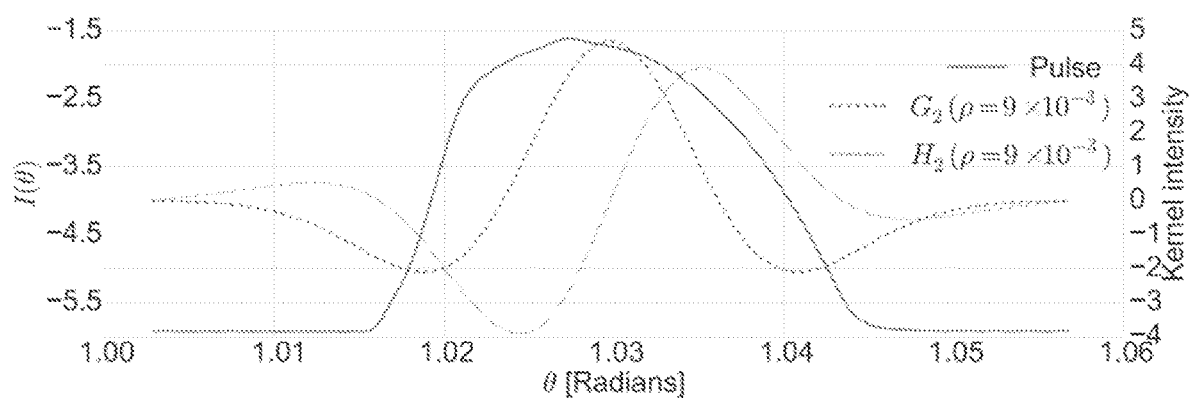
FIG. 13 shows a graphical view of a filter shape (in the experimental method of FIG. 4) for $\rho=9\times10^{-3}$ overlaid on a blade pulse.

The experimental method and processing algorithm have been described. The scaling parameter, p, is now chosen for the processing algorithm. The scaling parameter governs the filter spatial support and should be chosen so that the filter is at least as wide as a single pulse. For the experimental analysis, a scaling parameter was chosen so that the filter is approximately 1.8 times as wide as the blade pulses. The filter as calculated with $\rho=9\times10^{-3}$ is shown in FIG. 13 along with a pulse. This value for $\rho$ is denoted $\rho_0$. A sensitivity analysis will be presented where the scaling parameter is varied. The effect this has on the accuracy of the method is then tested.

Figure 14:
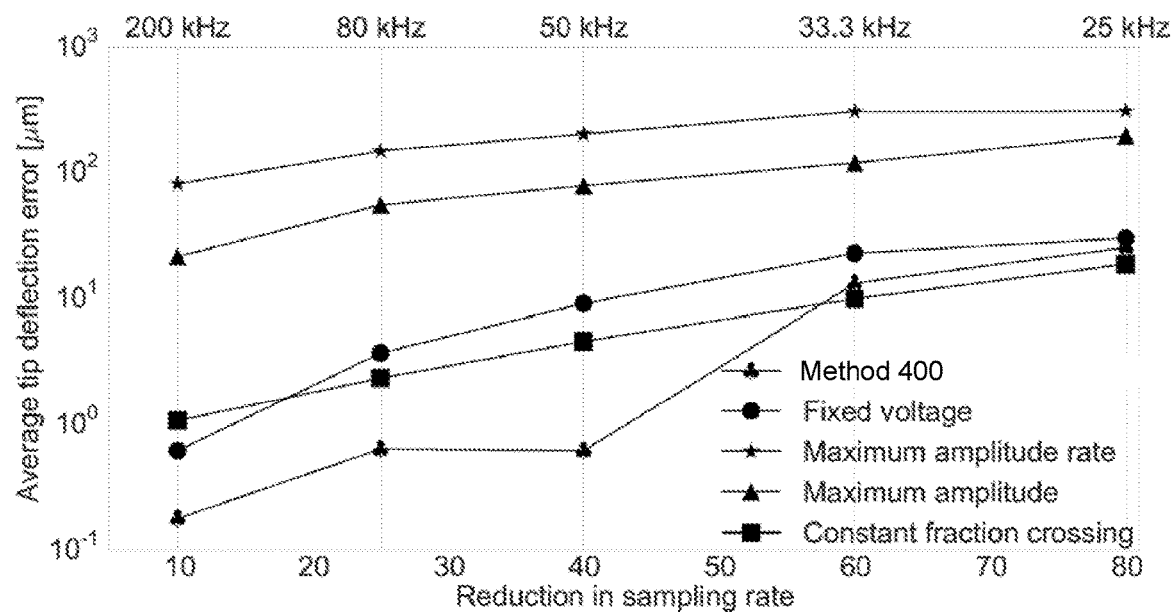
FIG. 14 shows a graphical view of an average error in tip displacement determination (in the experimental method of FIG. 4) for different triggering criteria and different reductions in sampling rate. The effective sampling rate of each reduction is also indicated at the top of the figure.

The average errors in blade tip displacement estimate, as computed through the various triggering criteria, for each reduction in sampling rate are shown in FIG. 14. From FIG. 14 it can be seen that the maximum amplitude and maximum amplitude rate methods are the least accurate triggering criteria. At a sampling rate reduction of only 10, using the maximum amplitude criterion already results in an error of 21 μm and the maximum amplitude rate method results in an error of roughly 80 μm. At the highest sampling rate reduction, large errors of approximately 200 μm and 310 μm result from using the two aforementioned techniques. It is clear that these two methods are considerably less accurate than the other three triggering criteria.

The constant fraction crossing method is more accurate than the fixed voltage method and both methods outperform the maximum amplitude and maximum amplitude rate methods. It is noted that an interpolation technique was used for both these methods that determined the exact ToA when the appropriate threshold has been crossed. This increases the accuracy of both methods. It can be seen that the method 400 is the most accurate triggering criterion up until a sampling rate reduction of 40 times. The average error at this reduction is 0.63 μm. This error is very small, even compared to the claims by commercial vendors being able to measure deflections of 3 μm. At this reduction rate, the triggering criterion with the closest average error is the constant fraction crossing method with an average error of 4.5 μm. The constant fraction crossing method however becomes more accurate than the method 400 at higher sampling rate reductions. At the highest sampling rate reduction, the method 400 has an error of 25.5 μm and the constant fraction crossing method has an error of 18.8 μm.

The method 400 shifts from being the most accurate method to less accurate than the constant fraction crossing method at the higher sampling rate reductions. This can be attributed to the fact that the method 400 works on the assumption of constant pulse shapes. The local phase shift in the one dimensional image is attributed to the shift of pulse location alone. If, however, the pulse shapes change, this will also contribute to the phase shift. The apparent pulse shape, which is supposed to be nominally constant, can change if the sampling rate is reduced too much.

Figure 15:
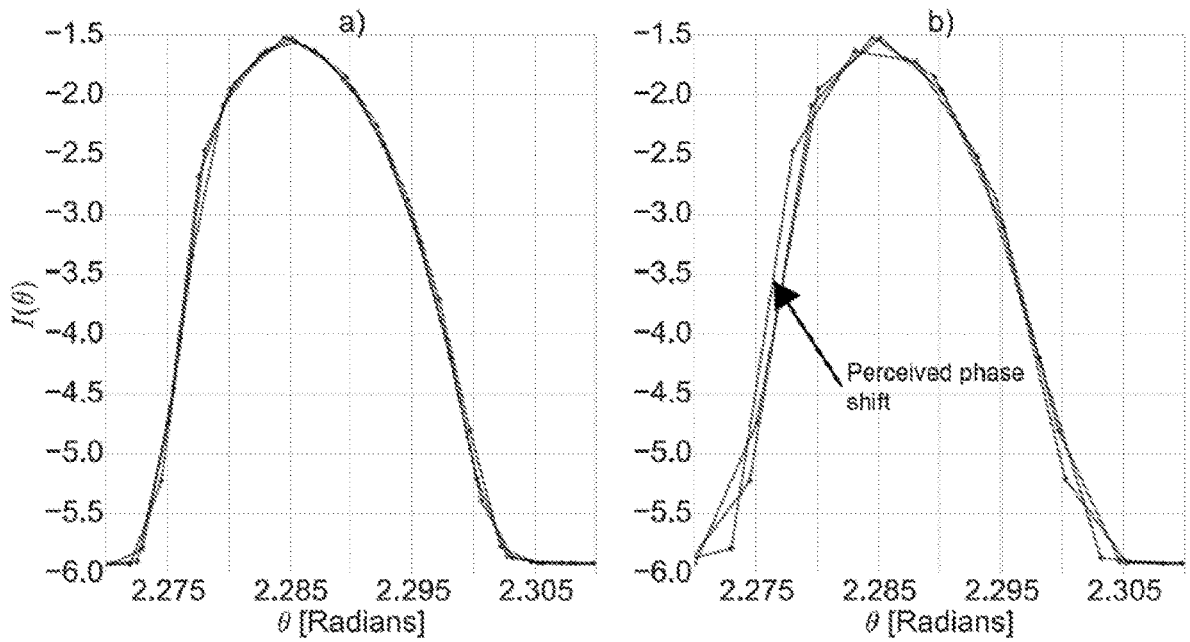
FIG. 15 shows a graphical view of a comparison in the pulse shapes of three consecutive pulses for a sampling rate reduction of a) 40 and b) 80. A perceived shape change and therefore phase shift can be seen for one pulse in figure b)

FIGS. 15 a) and b) shows a blade pulse from three consecutive revolutions for sampling rate reductions of 40 and 80 respectively. In FIG. 15, it can be seen that the three consecutive pulse shapes are very similar for a sampling rate reduction of 40. There are slight differences in the maximum amplitude but in general the pulses seem to start and stop at the same place. In FIG. 15 b), one of the pulses seem to be leading the other two at the start of the pulse but still ends in the same place as the other two. This pulse shape change creates a perceived phase shift in the pulse and contributes to the error in the tip deflection calculation. The accuracy of the method 400 is therefore subject to the sampling rate being high enough to capture a consistent pulse shape for each blade passage.

A kernel width of $\rho_0=9\times10^{-3}$ was used for the experimental tests. It was found that the method 400, using this value for the scaling parameter, yielded accurate results for the tip deflection estimations. A key requirement for the quadrature filter is that it should have sufficient spatial support. This means the filter width should be wider than the pulse width. However, the width of the filter should not be too wide, as then only a small fraction of the filter is being convolved with the actual pulse. The rest of the filter elements are being convolved with the DC offset signal measured by the probe between blade arrival times. The DC offset signal does not contain any information whatsoever and those filter kernel elements are therefore wasted.

A sensitivity analysis was undertaken where the scaling parameter was varied with the purpose of determining the optimal scaling parameter value for this type of pulse. The following scaling parameters were used in the analysis: $\rho=0.2\rho_0$, $0.4\rho_0$, $0.6\rho_0$, $0.8\rho_0$, $1.0\rho_0$, $1.2\rho_0$, $1.4\rho_0$, $1.6\rho_0$, $1.8\rho_0$, and $2.0\rho_0$. Once again, the average error of predicted tip deflections were calculated for each scaling parameter and each sampling rate.

Figure 16:
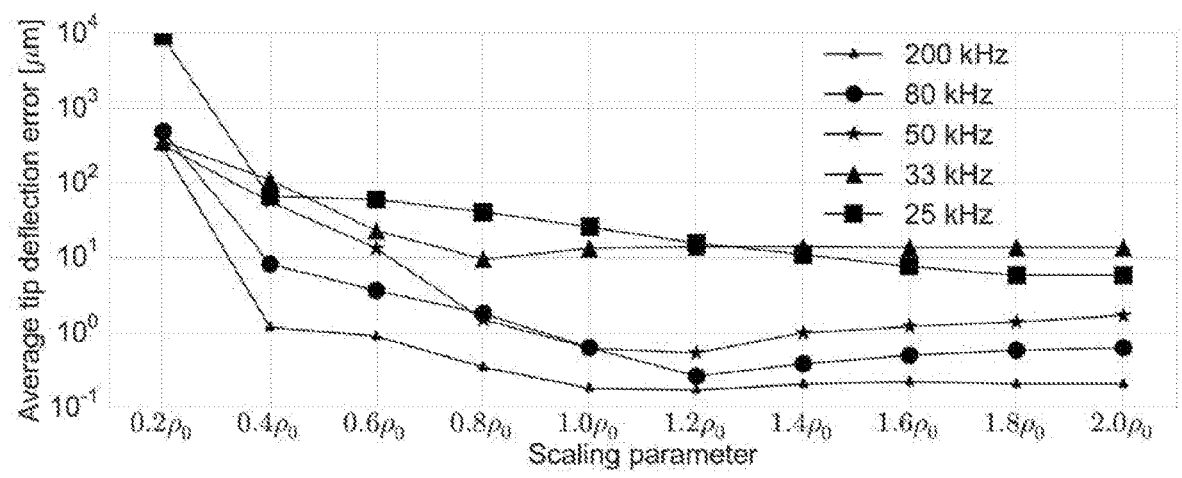
FIG. 16 shows a graphical view of sensitivity analysis (in the experimental method 400) where the scaling parameter $\rho$ is varied for different sampling rate signals.

FIG. 16 shows the results of this sensitivity analysis. From FIG. 16 it can be seen that using a quadrature filter with a small scaling parameter results in large average tip deflection errors. This is especially the case for $\rho=0.2\rho_0$ used at a sampling rate of 25 kHz, an error of 8300 μm is observed for this case. The average error for all sampling rates decrease as the scaling parameter increases up to approximately $1.0\rho_0$ to $1.2\rho_0$. At this point, a general trend is seen where the accuracy of the method decreases slightly as the scaling parameter increases to $2.0\rho_0$.

Exceptions to this rule can be observed for the lower sampling rate cases, 25 kHz and 33 kHz. These two sampling rates result in apparent changes in pulse shapes, as discussed earlier. These apparent changes in pulse shapes therefore also influence the optimal scaling parameter. It must be noted that the results in FIG. 16 appear on a log scale. The perceived decrease in accuracy of the 200 kHz results from $1.0\rho_0$ to $2.0\rho_0$ is only 0.037 μm, which is negligibly small even though it might appear substantial on the figure. It can therefore be concluded that the optimal scaling parameter value is between $1.0\rho_0$ and $1.2\rho_0$ for this particular pulse shape, subject to the apparent pulse shape remaining approximately constant.

The optimal parameters for these cases will be highly specific to the proximity probe in use as well as the rotor blade tip and material composition. Research efforts that optimise the permissible sampling rate and scaling parameter are therefore of practical interest and should be researched on a case by case basis. The methods and procedures outlined in this article can be used as a guide to determine these parameters. Some general conclusions can, however, be made. Of the four conventional triggering criteria, the maximum amplitude rate and maximum amplitude methods perform considerably less accurate than the other three methods. This stands in contrast to what is reported in other literature Zimmer [7], where it is said that the maximum amplitude method constitutes a highly accurate method of determining the tip displacement. The fixed voltage and constant fraction crossing methods perform similar in their accuracies and accurate in general. If the vibration amplitude of interest is in the range of 100 μm, as is reported by one source [6], the accuracy of using these two methods holds up well with a reduction in sampling rate. The method 400 exhibits the highest accuracy for moderate reductions in sampling rate (up to reductions of 40 times). The error induced in these cases by a reduction in sampling rate is less than 1 μm. The method 400 however becomes less accurate at higher reductions in sampling rates, such that it performs at approximately the same accuracy as the fixed voltage and the constant fraction crossing methods. This can be attributed to the change in apparent pulse shape, which in turn affects the local phase shift in the image.

The Applicant submits that the method 400 in accordance with the invention is a novel way to determine the tip deflections of rotor blades from BTT data. The method 400 interprets the proximity probe signals as one dimensional images that can be manipulated through image processing techniques. The method 400 uses a complex filter 224 to localise the phase information in the proximity probe images. The shift in local phase is then used to determine the rotor blade tip deflection for each pulse created by the blades $R_1$. The method 400 uses the entire pulse shape in the calculation, which stands opposed to conventional techniques which only uses one or two features of the pulse shapes.

An experiment was conducted where the tip deflections of a laboratory turbomachine was measured using four existing triggering criteria as well as the method 400. The raw signals were sampled at a rate of 2 MHz. The signal sampling rates were then reduced computationally and the relative accuracy of each method in determining the tip displacement was determined. It was found that the method 400 performed more accurate than the conventional methods for sampling rate reduction of up to 40 times. From this point onwards, the accuracy of the method 400 was similar to the fixed voltage and the constant fraction crossing methods. The maximum amplitude and maximum amplitude rate triggering criteria resulted in inaccurate tip displacement estimates and should therefore not be preferred to one of the other three. A sensitivity analysis was conducted where the scaling parameter of the filter 224 of the method 400 was adjusted. It was found that the optimal scaling parameter is between $9\times10^{-3}$ and $10.8\times10^{-3}$ for the particular pulse shapes obtained from the experimental test.

Figure 1:
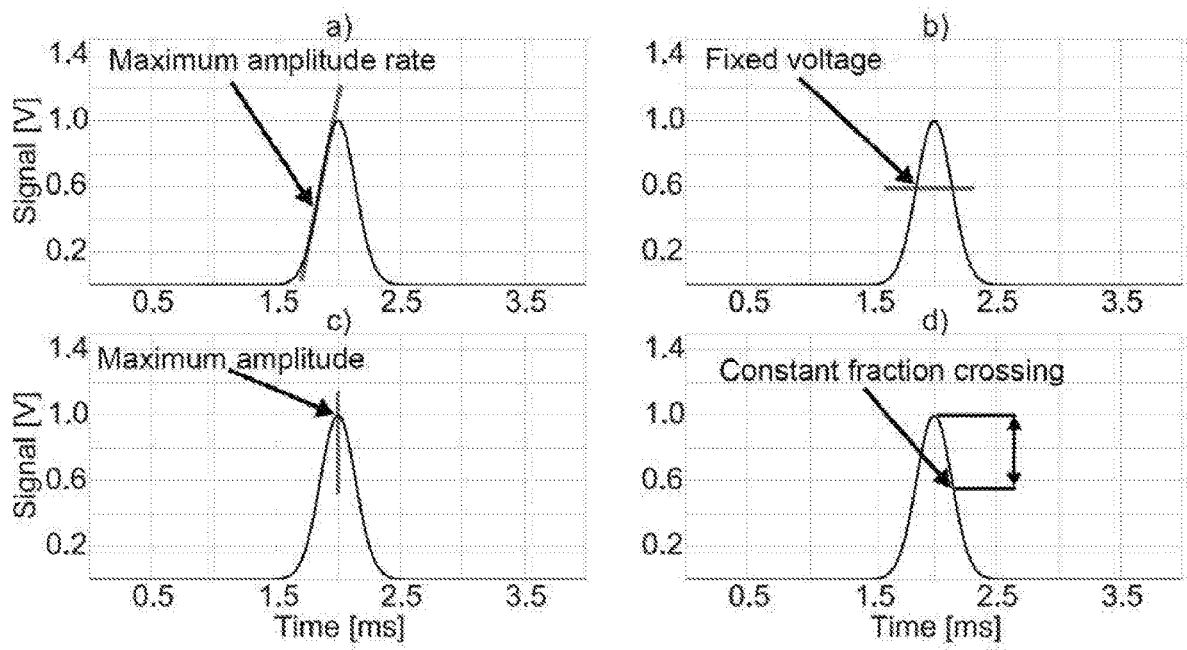
FIG. 1 shows a PRIOR ART schematic representation of measuring a ToA of a passing rotor blade tip.

The method 400 shows great promise to reduce the required sampling rate of conventional BTT systems. See FIG. 1 for an accuracy comparison between the method 400 and the four mentioned existing methods from tests that were conducted in the University of Pretoria's laboratory. In the tests, the sampling rate of the data acquisition system was decreased computationally, and the accuracies of the different methods were calculated. A big possible advantage of the method 400 is that a BTT system will be able to sample signals from much more sensors if the required sampling rate per sensor is reduced. This can be achieved by multiplexing the data acquisition input channels.

REFERENCES

[1] M. Zielinski, G. Ziller, Noncontact vibration measurements on compressor rotor blades, Measurement Science and Technology 11 (2000) 847-856.

[2] B. Salhi, J. Lardies, M. Berthillier, Identification of modal parameters and aeroelastic coefficients in bladed disk assemblies, Mechanical Systems and Signal Processing 23 (2009) 1894-1908.

[3] S. Heath, M. Imregun, A survey of blade tip-timing measurement techniques for turbomachinery vibration, Journal of Engineering for Gas Turbines and Power 120 (1998) 784-791.

[4] K. Joung, S. Kang, K. Paeng, N. Park, H. Choi, Y. You, A. von Flotow, ANALYSIS OF VIBRATION OF THE TURBINE BLADES USING NON-INTRUSIVE STRESS MEASUREMENT SYSTEM, in: Proceedings of the ASME Power Conference, ASME, Georgia, 2006, pp. 391-397.

[5] K. Grant, Experimental Testing of Tip-Timing Methods used for Blade Vibration Measurement in the Aero-Engine, Phd, Cranfield University, 2004.

[6] R. Szczepanik, E. Rokicki, R. Rzadkowski, L. Piechowski, Tip-Timing and Tip-Clearance for Measuring Rotor Turbine 395 Blade Vibrations, Journal of Vibration Engineering & Technologies 2 (2014).

[7] A. K. Zimmer, Investigation of the impact of turbine blade geometry on near-field microwave blade tip time of arrival measurements, Ph.D. thesis, Georgia Institute of Technology, 2008.

[8] Agilis, Non-Intrusive Stress Measurement Systems, 2014.

[9] P. Prochazka, F. Vanek, New Methods of Noncontact Sensing of Blade Vibrations and Deflections in Turbomachinery, Instrumentation and Measurement, IEEE Transactions on 63 (2014) 1583-1592.

[10] T. Chu, W. Ranson, M. Sutton, Applications of digital-image-correlation techniques to experimental mechanics, Experimental mechanics 25 (1985) 232-244.

[11] B. Gwashavanhu, A. J. Oberholster, P. S. Heyns, Rotating blade vibration analysis using photogrammetry and tracking laser Doppler vibrometry, Mechanical Systems and Signal Processing (2016) 1-13.

[12] J. G. Chen, N. Wadhwa, 405 Y.-J. Cha, F. Durand, W. T. Freeman, O. Buyukorturk, Modal identification of simple structures with high-speed video using motion magnification, Journal of Sound and Vibration 345 (2015) 58-71.

[13] D. H. Diamond, P. S. Heyns, A. J. Oberholster, Accuracy evaluation of sub-pixel structural vibration measurements through optical flow analysis of a video sequence, Measurement Under Revi (2016) 1-21.

[14] M. D. Coats, R. B. Randall, Single and multi-stage phase demodulation based order-tracking, Mechanical Systems and Signal Processing 44 (2014) 86-117.

[15] P. Borghesani, P. Pennacchi, S. Chatterton, R. Ricci, The velocity synchronous discrete Fourier transform for order tracking in the field of rotating machinery, Mechanical Systems and Signal Processing 44 (2014) 118-133.

[16] K. Fyfe, E. Munck, Analysis of computed order tracking, Mechanical Systems and Signal Processing 11 (1997) 187-205.

[17] D. Diamond, P. Heyns, a. J. Oberholster, Online shaft encoder geometry compensation for arbitrary shaft speed profiles 415 using Bayesian regression, Mechanical Systems and Signal Processing (2016) 1-16.

[18] D. H. Diamond, P. S. Heyns, A. J. Oberholster, The Use of a Kalman Filter for Performing Blade Tip Timing Measurement, Calibration and Resonance Detection, Mechanical Systems and Signal Processing (2016).

[19] B. R. Resor, M. W. Trethewey, K. P. Maynard, Compensation for encoder geometry and shaft speed variation in time interval torsional vibration measurement, Journal of sound and vibration 286 (2005) 897-920.

[20] W. T. Freeman, E. H. Adelson, The Design and Use of Steerable Filters, IEEE Transactions on pattern analysis and machine intelligence 13 (1991) 891-906.

[21] T. Gautama, M. M. Van Hulle, A phase-based approach to the estimation of the optical flow field using spatial filtering, IEEE Transactions on Neural Networks 13 (2002) 1-28.

[22] N. Wadhwa, M. Rubinstein, F. Durand, W. T. Freeman, Phase-based video motion processing, ACM Transactions on Graphics 32 (2013) 10.

[23] D. J. Fleet, D. J. Jepson, Computation of Component Image Velocity from Local Phase Information, International Journal of Computer Vision 5 (1990) 77-104.

[24] S. Heath, M. Imregun, An improved single-parameter tip-timing method for turbomachinery blade vibration measurements using optical laser probes, International Journal of Mechanical Sciences 38 (1996) 1047-1058.

[25] P. Procházka, F. Vanek, Contactless Diagnostics of Turbine Blade Vibration and Damage, Journal of Physics: Conference Series 305 (2011) 1-11.

[26] J. Gallego-Garrido, G. Dimitriadis, I. B. Carrington, J. R. Wright, A Class of Methods for the Analysis of Blade Tip Timing Data from Bladed Assemblies Undergoing Simultaneous Resonances Part II: Experimental Validation, International Journal of Rotating Machinery 2007 (2007) 1-10.

[27] A. Von Flotow, P. Tappard, Overview of Blade Vibration Monitoring Capabilities, 2011.

The invention claimed is:

1. A method of determining or estimating blade tip deflection characteristics of moving rotor blades in a turbomachine comprising a housing and rotor comprising a shaft with the rotor blades attached thereto and at least one proximity sensor mounted to the housing, the method comprising:
measuring, by the proximity sensor connected via a wired connection to a control module, a plurality of proximity signals caused by a presence of a proximate tip of a moving rotor blade;
sampling, by a data acquisition system, the proximity signals at a set sampling rate and between a maximum and a minimum voltage range;
calculating, by the control module based on measurements by at least one shaft encoder or derivation from the measurements of the proximity sensor, a shaft Instantaneous Angular Position (IAP) as a function of time;
storing, in a memory module, at least temporarily, the plurality of sampled proximity signals and associated shaft IAPs;
performing, by the control module, an order tracking process comprising:
expressing, by the control module, the plurality of sampled proximity signals in the angular domain; and
resampling, by the control module, the plurality of expressed proximity signals to render them equidistant in the angular domain; and
performing, by the control module, a pulse localization process comprising:
filtering, by the control module using a complex filter, the plurality of proximity signals yielding a complex-valued response;
expressing, by the control module, the complex-valued response in terms of a local amplitude and phase; and
calculating, by the control module, local phase shifts between each of the plurality of expressed signals and a reference signal, thereby to calculate the blade tip deflection characteristics.

2. The method as claimed in claim 1, wherein the control module is configured to perform order tracking on the proximity signals and the shaft IAP in order to convert the measured signals from having constant time increments to constant angular increments.

3. The method as claimed in claim 1, comprising raising an alert in response to the estimated deflection characteristics exceeding a first threshold.

4. The method as claimed in claim 3, wherein raising the alert comprises sending an alert message to a designated recipient.

5. The method as claimed in claim 1, comprising measuring a tip deflection every time that the associated rotor blade passes the proximity sensor.

6. The method as claimed in claim 1, wherein:
there are plural proximity sensors arranged circumferentially around the housing; and
the method comprises measuring the proximity signals caused by the blade tip at various angular orientations.

7. The method as claimed in claim 1, comprising measuring the rotor IAP through processing, by the control module, signals obtained from the shaft encoder.

8. The method as claimed in claim 1, comprising measuring the rotor IAP through processing, by the control module, the proximity signals obtained from the proximity sensor.

9. A non-transitory computer-readable medium having stored thereon a computer program which, when executed by a computer, causes the computer to perform the method as claimed in claim 1.

10. A method of determining or estimating blade tip deflection characteristics of moving rotor blades in a turbomachine comprising a housing and rotor comprising a shaft with the rotor blades attached thereto and at least one proximity probe mounted to the housing, the method comprising:
measuring, by the proximity sensor, a proximity signal caused by a presence of a proximate tip of a moving rotor blade;
calculating, by a control module based on measurements by at least one shaft encoder or derivation from proximity probe measurements, a shaft Instantaneous Angular Position (IAP) as a function of time;
storing, in a memory module, at least temporarily, a plurality of measured proximity signals and associated shaft IAPs;
performing, by the control module, an order tracking process comprising:
expressing, by the control module, the measured proximity signal in the angular domain; and
resampling, by the control module, the expressed proximity signal to render it equidistant in the angular domain; and
performing, by the control module, a pulse localisation process comprising:
filtering, by the control module using a complex filter, the proximity signal yielding a complex-valued response;
expressing, by the control module, the complex-valued response in terms of a local amplitude and phase;
calculating, by the control module, local phase shifts between each expressed signal and a reference signal, thereby to calculate the blade tip deflection characteristics; and automatically stopping the turbomachine in response to the calculated blade tip deflection characteristics exceeding a second threshold.

11. The method as claimed in claim 10, wherein:
the control module is connected to a control system of the turbomachine; and
the method comprises sending, by the control module, an interrupt message to the control system of the turbomachine.

12. A system configured to determine or estimate blade tip deflection characteristics of moving rotor blades in a turbomachine comprising a housing and rotor comprising a shaft with the rotor blades attached thereto and at least one proximity sensor mounted to the housing, the system comprising:
at least one proximity sensor mounted into the housing and configured to measure a proximity signal from a presence of a proximate tip of a moving rotor blade;
a sensor to measure or derive a shaft Instantaneous Angular Position (IAP);
a memory module on which is stored, at least temporarily, a plurality of measured proximity signals and associated shaft IAPs; and
a control module configured to:
express the shaft IAP as a function of time, whether this is derived from a shaft encoder or from the measurements of the proximity sensor;
perform an order tracking process comprising:
expressing the measured proximity signal in the angular domain; and
resampling the expressed proximity signal to render it equidistant in the angular domain; and
perform a pulse localization process comprising:
filtering using a complex filter, the proximity signal yielding a complex-valued response;
expressing the complex-valued response in terms of a local amplitude and phase signal; and
calculating local phase shifts between each expressed signal and a reference signal, thereby to calculate the blade tip deflection characteristics.

13. The system as claimed in claim 12, comprising a plurality of proximity sensors.

14. The system as claimed in claim 13, wherein the proximity sensors are spaced circumferentially around the housing.

15. The system as claimed in claim 14, wherein the proximity sensors are spaced circumferentially along only an arcuate portion of the housing along a 90° arc.

16. The system as claimed in claim 15, wherein the proximity sensors are irregularly spaced apart.

17. The system as claimed in claim 12, wherein the proximity sensor is embodied by one or more of:
a shaft encoder; or
the proximity sensor(s).

* * * * *